(12) United States Patent
Conner et al.

(10) Patent No.: US 6,816,882 B1
(45) Date of Patent: Nov. 9, 2004

(54) SYSTEM AND METHOD FOR AUTOMATICALLY NEGOTIATING LICENSE AGREEMENTS AND INSTALLING ARBITRARY USER-SPECIFIED APPLICATIONS ON APPLICATION SERVICE PROVIDERS

(75) Inventors: Michael Haden Conner, Austin, TX (US); Wayne Elmo Vicknair, Austin, TX (US); Craig Henry Becker, Austin, TX (US); Stewart E. Nicholas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 09/583,961

(22) Filed: May 31, 2000

(51) Int. Cl.[7] .............................................. G06F 13/00
(52) U.S. Cl. ...................... 709/203; 709/217; 709/219
(58) Field of Search ................................ 709/200, 201, 709/203, 206, 216, 217, 218, 219, 227

(56) References Cited

U.S. PATENT DOCUMENTS

| | | | | | |
|---|---|---|---|---|---|
| 4,780,821 | A | * | 10/1988 | Crossley ..................... | 364/200 |
| 5,918,010 | A | | 6/1999 | Appleman et al. ..... | 395/200.33 |
| 5,925,127 | A | * | 7/1999 | Ahmad ....................... | 395/186 |
| 6,108,779 | A | * | 8/2000 | Dean et al. ..................... | 713/2 |
| 6,212,564 | B1 | * | 4/2001 | Harter et al. ................ | 719/228 |
| 6,216,153 | B1 | * | 4/2001 | Vortriede ..................... | 709/203 |
| 6,339,826 | B2 | * | 1/2002 | Hayes, Jr. et al. .......... | 713/166 |
| 6,343,280 | B2 | * | 1/2002 | Clark ........................... | 705/55 |
| 6,411,943 | B1 | * | 6/2002 | Crawford ..................... | 705/400 |
| 6,510,466 | B1 | * | 1/2003 | Cox et al. .................... | 709/229 |
| 6,532,488 | B1 | * | 3/2003 | Ciarlante et al. ............ | 370/351 |
| 6,532,543 | B1 | * | 3/2003 | Smith et al. ................. | 713/201 |
| 6,546,002 | B1 | * | 4/2003 | Kim ............................ | 709/205 |
| 6,550,062 | B2 | * | 4/2003 | Barajas et al. .............. | 717/178 |

OTHER PUBLICATIONS

Java Virtual Machine Profiler Interface; Viswanathan et al.; Interational Business Machines Corporation; vol. 39, No. 1—Java Performance; pp. 1–14.
A Unifying Approach to Performance Analysis in the Java Environment; Alexander et al.; International Business Machines Corporation; vol. 39, No. 1—Java Performance; pp. 1–16.
IBM Application Framework for e–Business: Application Hosting Services; Nickolas, Oct. 1999; International Business Machines Corporation; pp. 1–6.
Architecture Overview; International Business Machines Corporation; pp. 1–4 & 1–7.

* cited by examiner

*Primary Examiner*—Moustafa M. Meky
(74) *Attorney, Agent, or Firm*—Duke W. Yee; Jeffrey S. LaBaw; Patrick C. R. Holmes

(57) ABSTRACT

A user contracts with an application service provider for hosting a needed application. By contracting with a service provider the user may interact with the application by using only a thin client rather than maintaining a thick client. The user rents an application from either the service provider or an independent application provider. If the user procures the application from an application provider, the application provider negotiates hosting terms with the service provider prior to installing the application into the service provider's warehouse. The application provider also checks that the services provided by the service provider meet the minimum requirements of the application. Once installed, the service provider may offer the application to other users along with services for the application. The user may procure additional services from the service provider for supporting the application. A user can then dynamically download the application "on-demand".

16 Claims, 7 Drawing Sheets

OPEN, SHARED HOSTING MODEL

SYSTEM AND METHOD FOR AUTOMATICALLY NEGOTIATING LICENSE AGREEMENTS AND INSTALLING ARBITRARY USER-SPECIFIED APPLICATIONS ON APPLICATION SERVICE PROVIDERS

BACKGROUND OF THE INVENTION

1. Technical Field

The present invention relates to information technology. More particularly the present invention relates to a method and system for hosting applications.

2. Description of Related Art

Prior to the advent of the personal computer (PC), information technology (IT) professionals were responsible for determining which applications to support and make available to the individual users on client computers supported by the network system. Once the IT professional perceived a need for a particular application, the application was acquired and mounted on the system mainframe for access by the client computers. This model was very manageable because most decisions regarding the network were made, at least in-part, by the IT professionals. Total system costs were easily controlled due to the inherent centralized management approach. Software licensing and tracking was also made easy by the localized housing of applications and by the centralized management. The shortcomings of this model became instantly apparent to users. These shortcomings included the lag time between detecting a need for a particular application and installing the application, along with the inability of a system (and the IT professionals servicing that system) to support variants of the same application type. Operating systems also constrained the choice of applications to those written for the particular operating system being employed. Finally, it was very difficult for individual users to persuade IT professionals to acquire a particular application because the IT professionals were faced with economic justification restrictions that limited application procurement to only those applications having almost universal need by users.

The introduction of PCs alleviated many the above mentioned problems by making applications available to users on a per-client basis. PCs also allowed the structure of applications to evolve into a self-contained program that performed specific functions directly for the user. Applications contained the necessary graphical user interfaces and libraries to support the individual functions necessary for the application. Applications were written with the end user in mind, offering the user a wide range of functionality and scalable libraries for upgrading the basic functions to suit the future needs of the user. Typical applications came equipped with an almost never-ending list of user preferences and options for personalizing the application and thus, it was hoped, increasing user productivity. PCs were easily upgraded to provide the necessary level of support for the individual user's applications.

However, with the PC came the almost inevitable problem of keeping individual applications and PCs upgraded for individual users. The goal was to maximum the effectiveness of the user without overspending on a per-user basis. Support costs, including maintaining and upgrading PCs, rose disproportionately with the quantity of PCs being supported because of the dissimilar states of individual PCs, applications and services. Software licensing also became a serious problem due to the never-ending stream of upgrades and new applications. The lack of a centralized warehouse for applications made tracking applications difficult. Many times licenses on necessary software would expire, while licenses for unnecessary and out-of-date applications were maintained long past the useful life of the application. Total cost of ownership (TCO) became the new catch phrase for IT professionals who were attempting a gain control of costs and support requirements that were spiraling out of control.

Upgrading PCs and software within a corporate network is a continual problem for IT professionals. Both hardware and software must be upgraded within the network in a precise sequence in order to avoid system and software incompatibility problems. For example, once the decision has been made to upgrade software applications (or install newly released software applications), the IT professionals must evaluate the corporate network for compatibility with the applications. If the network is found in need of upgrade to support the new application, the PCs in the network must be upgraded prior to installing new or upgraded applications. Thus, upgrading applications on the corporate network must be deferred until the hardware has been upgraded.

Only after technicians have upgraded each PC in the network, can the upgraded applications be installed. So generally, installing upgraded applications on the network is synchronized with the installation of hardware upgrades. This hardware/software synchronization limits the inherent customizability of PCs on the corporate network to the customizability of the PC with the least upgraded hardware on the corporate network, or at least a subgroup of the corporate network.

Additionally, performing a software release on a corporate network is a difficult process for IT professionals because of the varying state of application customizing by the individual PC users. Some users may only make minor changes in the user options or preferences, while other users may make wholesale changes in the user's preferences to better suit that user's work atmosphere. When major software applications and/or operating systems are upgraded, many times the user preferences are lost in the upgrade process, are not importable or are not compatible with the upgraded software. The user is then left with the task of relearning and resetting the preferences. Of course, the corporate IT professionals and help centers are then burdened with an influx of user questions and problems resulting from having to reset the preferences.

User customized applications also present a problem for IT professional during each service problem reported by the user. Before attempting to diagnose a reported problem, the technician must ascertain the problem is not directly related to the user's preference selections. Therefore, to accurately troubleshoot a PC, the technician must be well versed with each application loaded on the user's PC.

It would be advantageous to provide a flexible IT model without the total cost of ownership problems associated with personal computing.

SUMMARY OF THE INVENTION

The present invention relates to a system, method and instructions for negotiating license agreements and installing arbitrary user-specified applications on application service providers. Initially, a user perceives a need for an application. However, rather than the user supporting the application, the user contracts with an application service provider (ASP) for hosting the application. Thus the user may interact with the application by using only a thin client. The user then rents the application from either the application service provider or an independent software provider (ISP), such as an application provider (AP).

If the user procures the application from an application provider, the application provider negotiates hosting terms with the application service provider prior to installing the application into the application service provider's warehouse. The application provider also checks that the services provided by the application service provider meet the minimum requirements of the application. Once installed, the application service provider may offer the application to other users along with services for the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
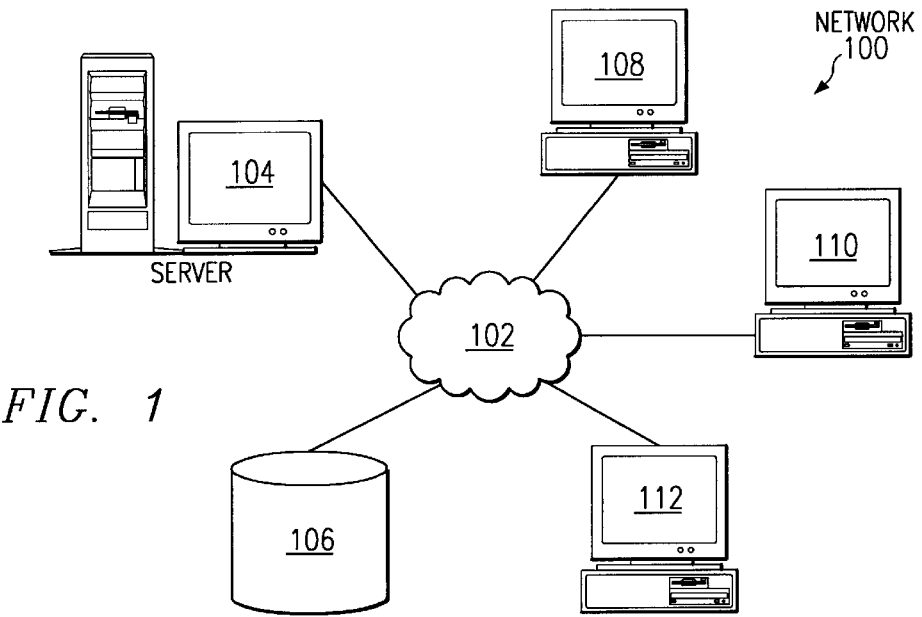
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
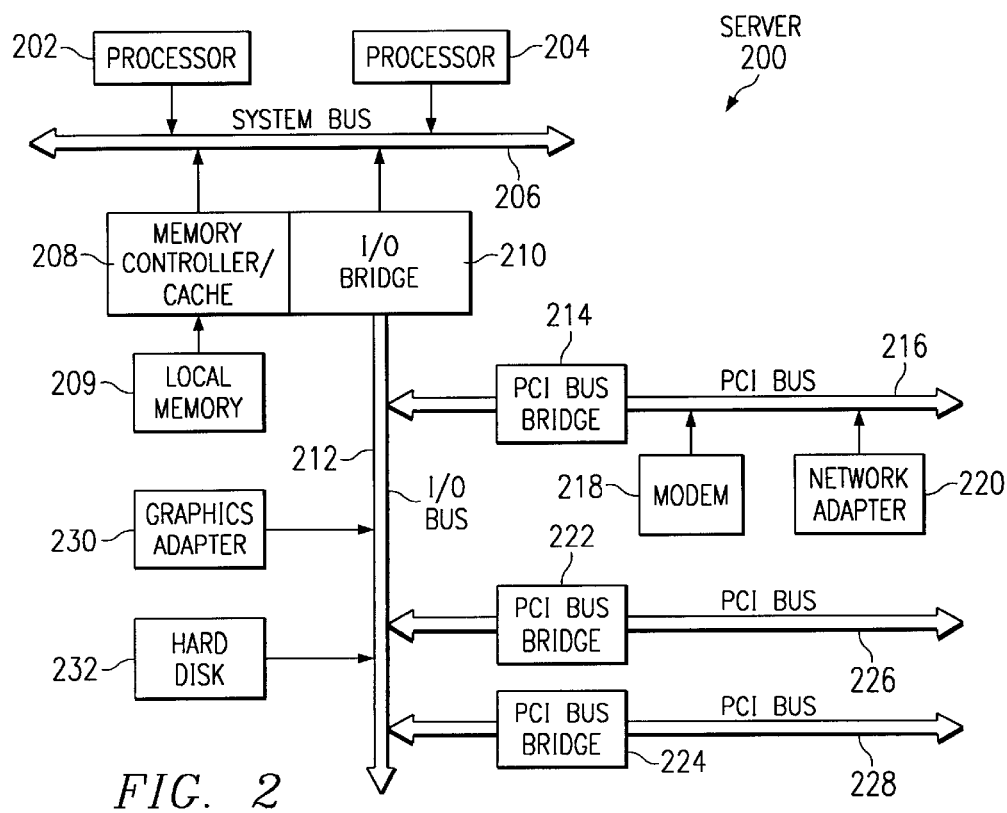
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Figure 3:
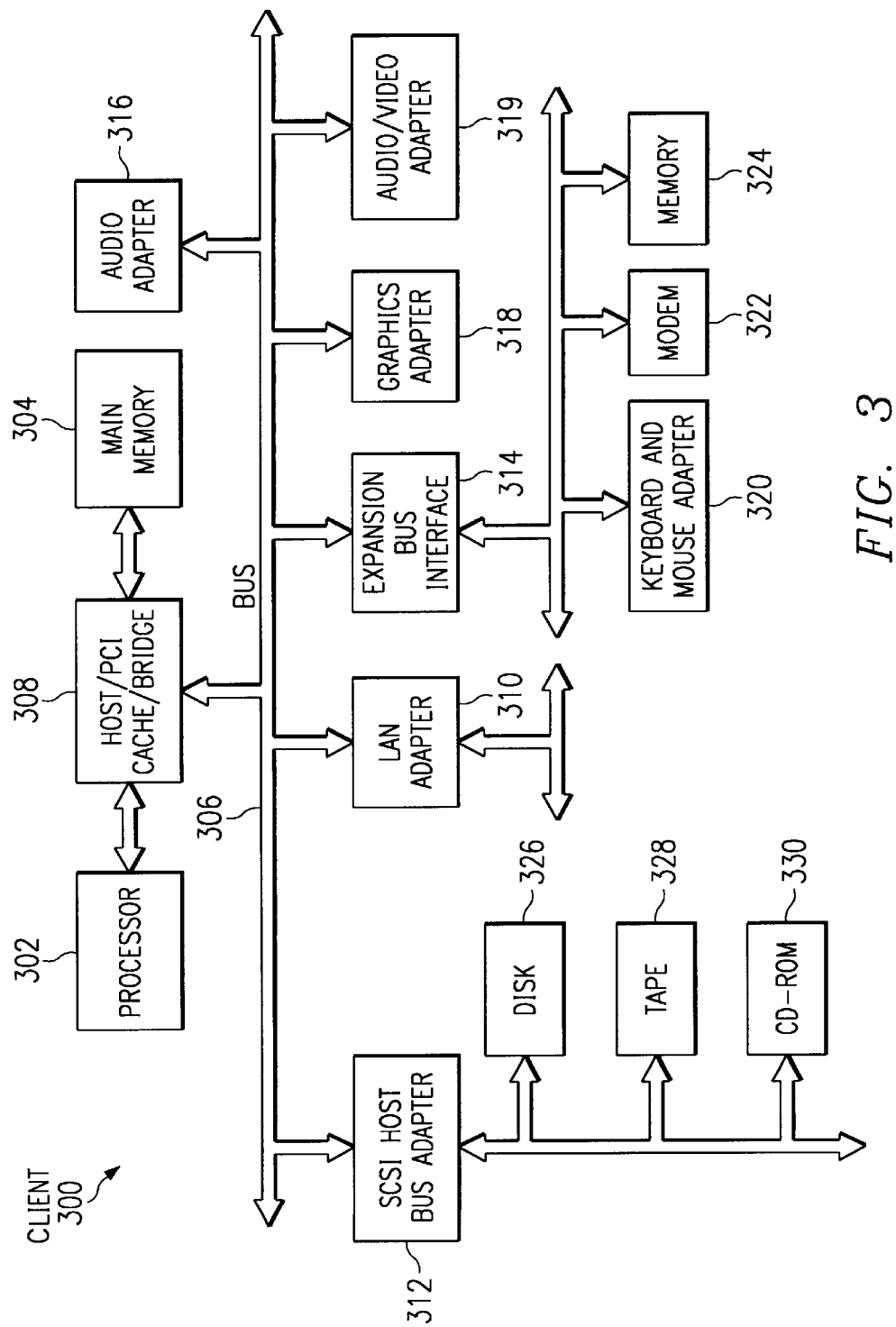
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Supporters claim that mainframes still house ninety percent of the data major businesses rely on for mission-critical applications, attributing this to their superior performance, reliability, scalability, and security compared to PCs. However, as discussed above upgrading applications in a mainframe IT model requires a quorum of individual users to agree on an application prior to installing the application on the mainframe. Many times, mainframe operating systems will not support a particular application even if a quorum were reached. Although the PC model is much more flexible, it is harder for IT professionals to implement a practical support mechanism and therefore can be far more expensive. Merely tabulating an accurate accounting of total operating costs can be a daunting task in the PC environment.

Given the above-mentioned problems, application service providers (ASP)s were born. Service providers combine software, hardware and networking technologies to offer service-based applications as opposed to corporate-owned, corporate-run applications. Among the application services offered by high-end hosting services are ad servers, payroll systems, back-end business and enterprise resource planning systems. Service providers help corporations to cut costs on software and network services and the IT professionals to develop and support them, as well as providing a new way to deploy applications to a distributed work force. Service providers own the software licenses, host the applications and deliver them over a network, deal with upgrades, run help desks, and offer consulting and integration services. Industry pundits now say that application hosting and rental is the future of the software market.

Service providers that offer application hosting services deliver e-business application content over a network such as the Internet. The application framework for e-business provides a full range of services for developing, deploying, and managing e-business applications. Application hosting services are a key component of the framework and play a key role in the framework's support for portals.

Figure 4:
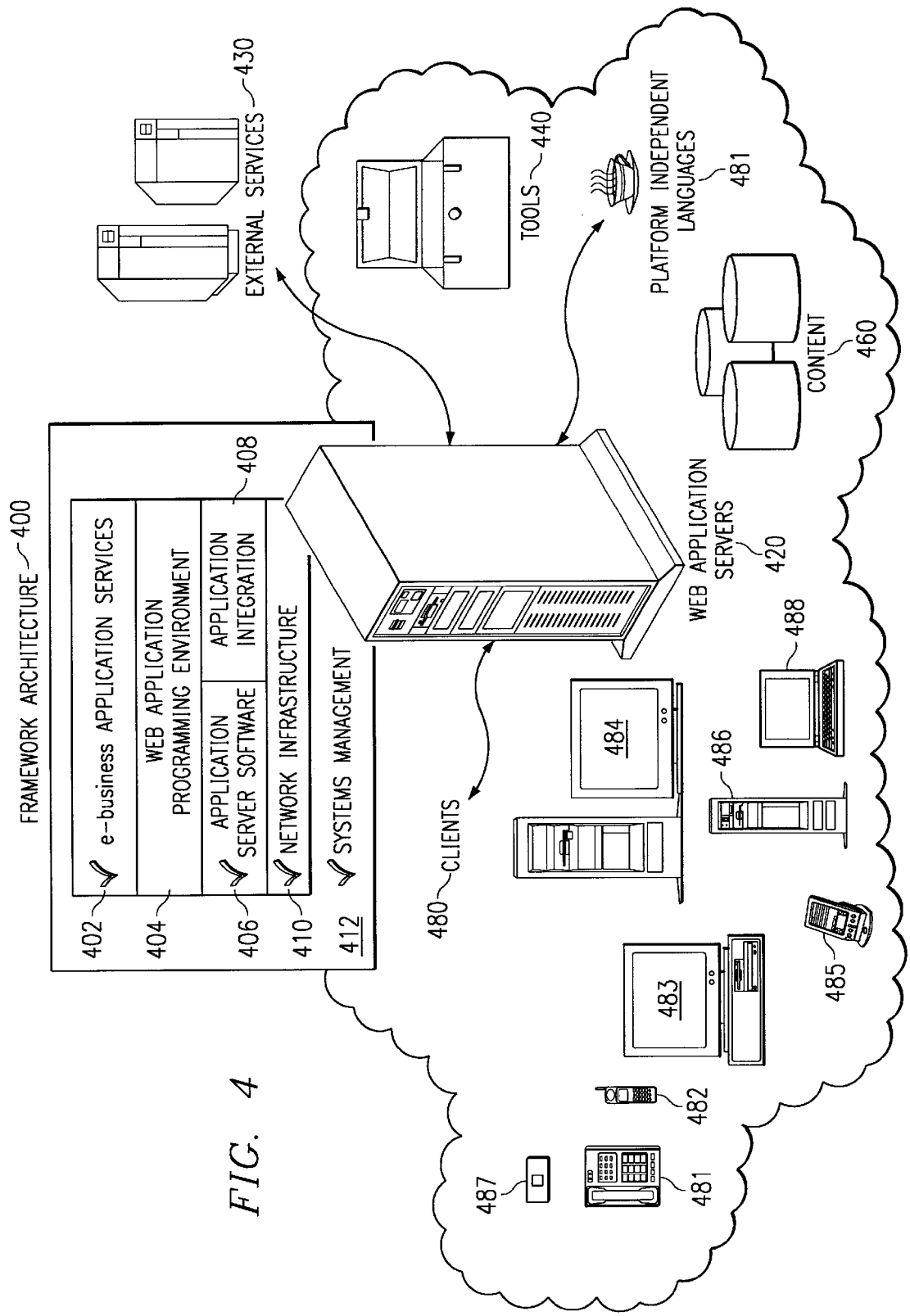
FIG. 4 is a framework architecture for providing e-business.

Referring now to FIG. 4, a diagram of a framework architecture for providing e-business is provided. These services extend and enhance several layers of the framework including e-business application services 402, application server software 406, network infrastructure 410 and system management 412, as illustrated by the check marks.

Framework 400 is based on an n-tier distributed environment where any number of tiers of application logic and business services are separated into components that communicate with each other across a network. In its most basic form, the framework 400 can be depicted as a "logical" three-tier computing model, meaning that there is a logical, but not necessarily physical, separation of processes. This model is designed to support thin clients with high-function Web application and enterprise servers.

A prototypical three-tier architecture consists of: client tier; Web application server; and servers to support the Web application server. The client tier contains logic related to the presentation of information (i.e. the graphical user interface) and requests to applications through a browser or Java applet. Web application servers contain the business logic and processes that control the reading and writing of data. Finally, servers, such as backend servers, support the Web application server, provide the data storage and transactional applications used by the Web application server processes. For example, the backend servers may be Oracle database servers, legacy database servers, and the like.

The application elements residing in these three logical tiers are connected through a set of industry-standard protocols, services, and software connectors. The application framework for e-business architecture provides a full range of services for developing and deploying e-business applications. Because it is based on industry standards, the framework has the ability to plug-and-play multiple components provided by any vendor. Framework architecture 400 is composed of the following key elements:

Clients 480 based on a thin client, Web browser/Java applet model that enables universal access to framework applications, and on-demand delivery of application components.

Network infrastructure 410 that provides services such as TCP/IP, directory, and security whose capabilities can be accessed via open, standard interfaces and protocols.

Application server software 406 that provides a platform for e-business applications and includes an HTTP server, database and transaction services, mail and groupware services, and messaging services.

Application integration 408 that provides access to existing data and applications.

Web application programming environment 404 that provides the server-side servlet and Enterprise Java programming environment for creating dynamic and robust e-business applications.

e-business application services 402 that provide higher level application specific functionality to facilitate the creation of e-business solutions.

Systems management functions 412 that accommodate the unique management requirements of network computing across all elements of the system, including users, applications, services, infrastructure, and hardware.

Development tools 440 to create, assemble, deploy and manage applications.

Clients 480 supported by framework 400 are "thin clients", meaning that little or no application logic is executed on the client and therefore relatively little software is required to be installed on the client. In this model, applications are managed on the server and dynamically downloaded "on-demand" to requesting clients. As such, the client portions of new applications should be implemented in hypertext markup language (HTML), Dynamic HTML, extensible markup language (XML), and Java applets. Framework 400 supports a broad range of fixed clients (computers 483, 484 and 486, mobile clients (laptop 488), and "Tier 0" clients (digital cellphone 482, appliance 481, PDA 485, smartcard 487, etc.) based on industry initiatives such as the Network Computer Profile, and the Mobile Network Computer Reference Specification.

Network infrastructure 410 provides a platform for the entire architecture. It includes the following services, all based on open standards:

TCP/IP and network services like dynamic host configuration protocol (DHCP) that dynamically assigns IP addresses as devices enter and leave the network.

Security services based on public key technology that support user identification and authentication, access control, confidentiality, data integrity, and non-repudiation of transactions.

Directory services that locate users, services, and resources in the network.

Mobile services that provide access to valuable corporate data to the nomadic computing user.

Client management services that support the setup, customization, and management of network computers, managed PCs, and in the future Tier 0 devices such as smartcards, digital cellphones, etc.

File and print services that are accessed and managed via a standard Web browser interface.

Application server software layer 406 provides the core functionality required to develop and support the business logic of e-business applications running on the Web application server. It includes the following services:

An Hypertext Transfer Protocol (HTTP) server that coordinates, collects, and assembles Web pages composed from static and dynamic content and delivers them to Framework clients.

Mail and community services that provide e-mail messaging, calendaring and group scheduling, chat, and newsgroup discussions.

Groupware services that provide a rich shared virtual workspace and support the coordination of business workflow processes.

Database services that integrate the features and functions of an object-relational database with those of the Web application server.

Transaction services that extend the Web application server by providing a highly available, robust, expandable and secure transactional application execution environment.

Messaging services that provide robust, asynchronous communication and message brokering facilities that support a publish/subscribe model of communication and message transformations.

Application integration component 408 of the framework 400 allows disparate applications, potentially written in different programming languages and built on different architectures, to communicate with each other. The bulk of critical data and application (especially transactional) programs reside on and use existing enterprise systems. Application integration allows Web clients and servers to work together with this data and these application programs, seamlessly linking the strength of the Internet with the strength of the enterprise.

Three methods of integration are supported, connectors, messaging services and managed object services. Connectors are gateway software that provide linkage between the Web server and services that are reached through the use of application specific protocols. For example, a connector may be the common connector framework in IBM's VisualAge, or the like. Messaging services provide asynchronous communication and message brokering facilities including message transformations. For example, a messaging service may be the MQ series integrator, or the like. Managed object services enable object wrapping of existing application logic written in any language. For example, the managed object service may be JavaBeans, or the like. As a result, existing application logic is extended to object-oriented environments.

Web application programming environment 404, based on Java servlets, Enterprise Java services and Enterprise Java-Bean components, provides an environment for writing dynamic, transactional, secure business applications on Web application servers. Services are provided that promote separation of business and presentation logic enabling applications to dynamically adapt and tailor content based on user interests and client device.

The e-business application services 402 are the building blocks that facilitate the creation of e-business solutions. They are higher level application oriented components that conform to the framework's programming model. They build on and extend the underlying application server software and network infrastructure with functions required for specific types of applications, for example, e-commerce applications. As a result, e-business solutions can be developed faster with higher quality. Examples of e-business application services include payment services, catalog services, and order management services.

Within an enterprise, systems management services 412 provide the core functionality that supports end to end management across networks, systems, middleware and applications. Framework 400 provides the tools and services that support management of the complete lifecycle of an application from installation and configuration, to the monitoring of its operational characteristics such as availability and security, to the controlled update of changes. Across multiple enterprises, framework 400 provides a collaborative management approach for establishing and following procedures to share information and coordinate problem resolution with business partners. This collaborative approach includes policy management, data repository, scheduling and report generation.

The framework 400 provides a broad range of tools to enable creation, deployment and management of e-business applications for Internet, extranet and intranet environments. It also supports integrating 3rd party tools into the development process. The Framework 400 supports the different skill sets involved in developing Web applications, providing tools that target specific skill sets, and facilitates collaboration among members of the development team.

API and protocol support is provided in each component of application framework 400 for standard protocols and APIs through, among other mechanisms, platform independent languages 481. While a complete and competitive set of products may be implemented in framework 400, other implementations can also work within it.

Service providers offer customers and independent software vendor (ISVs) combined software, hardware, and networking technologies to offer service-based applications. Theses service-based applications include resource planning (ERP), sales force automation, collaboration, Web hosting, and e-business applications to name a few. Service providers divide the labor between Internet access and application delivery, which protects customers from relying solely on one provider for both. Service providers also enable the customer to amortize the cost of applications by reducing the skill requirements for operation and maintenance of the business application.

For customers, the service provider provides software and management services and the personnel needed to develop and support them, which can be highly cost effective. Users concentrate on their core business processes while the service provider provides infrastructure support such as software license management, application hosting, billing, subscription management, service level monitoring, network delivery of applications, version management, help desk, consulting, and integration services.

For application providers, service providers enable new channels for deploying applications into a distributed environment by supplying infrastructure and offering global access. The service provider provisions a Web presence, while the application provider delivers application content. The model reduces the complexity of application and resource management by providing a common set of infrastructure components, which enable the delivery of a higher quality and more cost-effective level of service. These factors combine to lower the cost of entry and reduce time-to-market for the application provider.

Presently there are three predominant service provider models: co-locating, dedicated and shared hosting. Co-locating requires the application provider to co-locates the machines running the application with a bandwidth provider (an Internet service provider). The application provider is responsible for managing application server machines remotely or on site. The application provider integrates and customizes the offerings into the service provider's existing infrastructure. The dedicated model is similar to the traditional out-sourcing model in which the service provider provides dedicated machines to a business running a fixed set of applications. The dedicated hardware typically runs ERP applications and provides a guaranteed level of service and availability. The service provider manages both application content and infrastructure. Finally, with respect to the shared hosting model the service provider provides bandwidth, machines, and software services for supporting shared applications. The applications are shared among multiple enterprises with multiple users on a virtual host.

The co-locating and dedicated models require that the service provider go through the steps of procuring, installing, and deploying a new server and an application instance for each new company joining its service. The operation scalability is predictable and linear, and has some economies-of-scale in people costs at the low end of the growth curve. However, these models have severe implementation challenges past the "knee" of the exponential growth curve.

The shared hosting model leverages shared services across multiple users and applications. Shared services and infrastructure maximize the potential for realizing economies-of-scale as the size of the service provider increases. The model has a lower incremental cost for each customer than the co-locating and dedicated models. To achieve the necessary economies-of-scale, the service provider's infrastructure is designed to explicitly address the operational cost forces introduced by the Internet environment, which include: rapid change and constant flux; exponential growth; support for small and medium businesses; and offer and deliver service-level agreements.

Rapid change and constant flux cost forces refer to new applications, subscribing companies, and additional users need to be constantly added, as well as new versions of operating systems, applications, hardware, and networking technology.

Exponential growth means that successful service providers/application providers experience exponential growth of their subscription base due to the vast reach of the Internet. Support for small/medium businesses includes dedicating servers to more than a limited number of larger customers.

Prior art models utilizing dedicating servers to a limited number of customers do not scale to Internet usage. Management personnel requirements for the prior art model are also significantly more than the shared model.

As to offering and delivering service-level agreements (SLAs), service providers optimize operational costs while still delivering SLA-specified levels of service. SLAs may be contractual, with substantial penalties being incurred for non-performance. The robust architecture employed by service providers place a premium on reliability, availability, and scalability.

Service providers cost effectively manage and monitor a multi-tier application architecture environment. The applications that are best designed for a service provider environment are based on newer component-based architectures such as Enterprise JavaBeans. While the resulting architectures are highly flexible and well suited to Internet deployment, they also result in a more complex n-tier architecture: Web servers; application servers; and back-end database servers. Thus, service providers strike a balance between their costs of operation and the levels of service they provide to customers.

Within the shared hosting model, there are two distinct types of application hosting: closed and open. In the closed shared hosting model the service provider hosts a fixed set of applications from which the user must choose. This is the model many portals use today. In contrast, in the open shared hosting model the service provider enables the site administrator and the user to install applications from any application provider by providing a common set of services for user, resource and application management functions.

Figure 5:
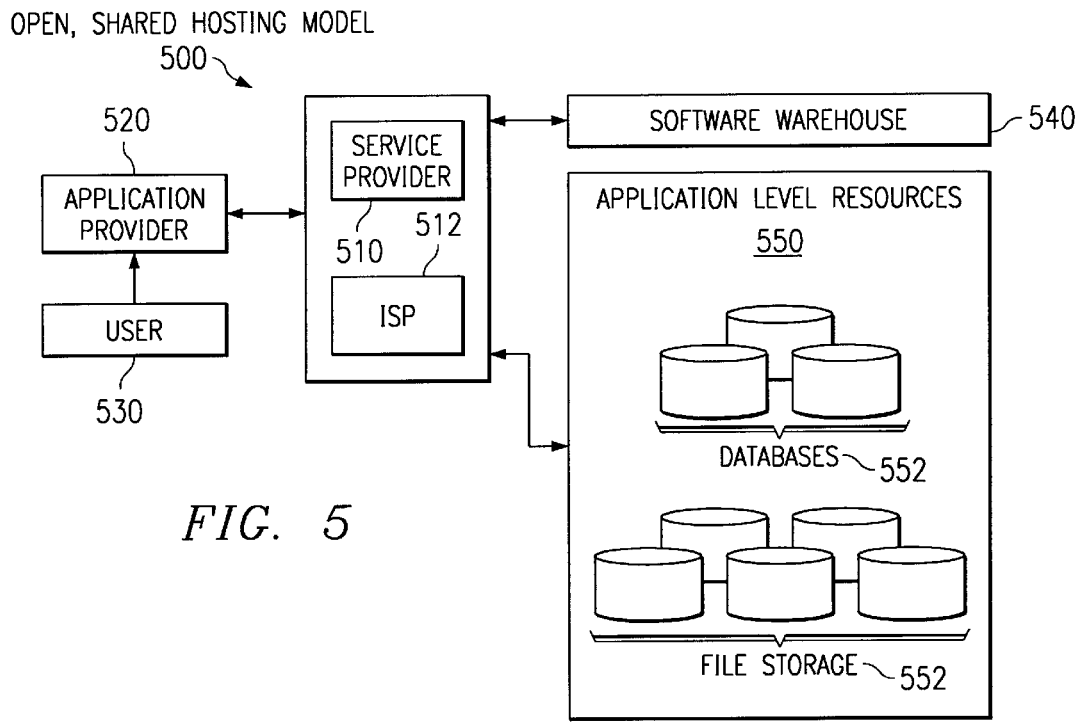
FIG. 5, a diagram of an open, shared hosting model is depicted in accordance with a preferred embodiment of the present invention.

Referring to FIG. 5, a diagram of an open, shared hosting model is depicted in accordance with a preferred embodiment of the present invention. Open, shared hosting model 500 includes service provider 510 associated with Internet service provider (ISP) 512. User 530 uses a client system (not shown) for communicating to and interacting with service provider 510 via ISP 512. As discussed above, the client system may be configured as thin clients and need not employ application logic. Thin client applications are managed on service manager 510 and dynamically downloading client portions of the applications in HTML, Dynamic HTML, XML, and/or Java applets. Service manager 510 provides user 530 with processing capabilities above that configured in the client computers.

Service provider 510 maintains a variety of client applications in software warehouse 540 for use by user 530. User 530 may instead contract with application provider (ISV) 520 for client applications to be executed by service provider 510 that are not offered by service provider 510 and not resident in software warehouse 540. User 530 also buy or rent client applications from application provider 520 in lieu of identical applications offered by service provider 510 in order to take advantage of a lower price or more favorable contract terms. In those cases, application provider 520 negotiates a license agreement with user 530 for an application that includes provisions for the application to be hosted by service provider 510 rather than executed on a client computer operated by user 530. Essentially service provider 510 rents an application from application provider 520 for the exclusive use of user 530.

Application hosting, or application rental, represents big opportunities for service providers and resellers. These opportunities are fully realized by solving challenges related to the application rental market maturing from a closed to an open hosting environment.

Initially, service provider 510 invests in the infrastructure capable of handling high-end solutions providing secure access and high availability to services. Providing reliability guarantees and monitoring compliance to service agreements are key components of providing quality service for user 530. Service provider 510 also provides strong security for user 530 because as more companies move core business function outside of the company, data and application isolation as well as high-quality firewall implementations are essential for protecting sensitive internal data. User 530, while being an individual user or a corporate user, may have a corresponding need for strong security, however, service provider 510 offer layers of security for its customers based on their individual security needs.

Service provider 510 also provides to user 530 offerings that operate as a seamless unit when in reality the service provider's offerings may be implemented as a mixture of new and legacy components. Open standards may be set to ensure a predictable environment such that the service provider 510 cost-effectively integrates these components, thus lowering the total cost of ownership.

Components and Internet standards are evolving rapidly and greatly facilitate re-use. Therefore, many business applications may have been designed for a single purpose/ company; they run on thick clients and are inherently single company-based. As a result of this situation, many application providers (or ISVs) are breaking out their client software into JavaBeans components. Application provider 520 supports an Internet component model based on existing and evolving standards in order to maximums its presence on the Internet.

Another challenge addresses by service provider 510 and application provider 520 is breaking the "one size does not fit all" mold. Application provider 520 offer highly customizable applications to user 530 while service provider 510 supports a high degree of customization and personalization at all levels. User 530 can then customize the look of applications as well as the data model and workflow of hosted applications. Hosted applications are factored and provide data models that are open, extensible, and standards-based for supporting the level of customization required.

Service provider's 510 infrastructure supports the Internet growth curve and scale. In the recent past, most business applications supported only one company per application, which implies that for each customer service provider 510 provides dedicated hardware and software to user 530. This model did not support Internet volume. Therefore, the infrastructures of providers engaging in open shared hosting enable applications to be shared by multiple enterprises with multiple users across a single virtual host in order to realize the economies-of-scale necessary to support large volumes of users.

Finally, the service provider model requires that a service provider 510 charge a fee higher than the aggregate cost of the application and the cost of running, managing, and hosting that application. Additionally, for a specified service level, service provider 510 optimizes its cost structure by implementing a shared services architecture, rather than a dedicated server per customer architecture. As the number of users increase, the value of this architecture becomes more apparent as the architecture becomes considerably more cost-efficient.

The application framework for e-business supports a set of application hosting services for creating, publishing, and managing open, standards-based applications for the rental market. A common set of services are used by the application provider 520, enabling service provider 510 to host a variety of application types in a shared hosting model. The services provide an infrastructure for automating the tasks involved in creating and integrating hostable applications into service provider's 510 environment. These services enable service provider 510 to transition from the prior art closed hosting to an open hosting environment, as described above.

The application hosting services consist of a set of service interfaces provided by service provider 510 and used by application provider 520. Service provider 510 provides a set of implementations of the service interfaces that enable the site to publish, accept subscriptions, receive payment, and manage open, standards-based applications. Each service is extensible, so that service provider 510 may tailor the model to fit specific needs. The default implementations provide a reasonable platform to provide out-of-the-box solutions for service provider 510 and application provider 520.

The application hosting services provide application provider 520 with a single set of interfaces enabling the application to participate in the lifecycle (installation, usage, suspension, removal) and billing aspects of the application. Existing framework-based applications may evolve to take advantage of these services, which means they can be integrated into and offered by service provider 510 with little or no change. Over time, the application are modified to leverage the services to automate the integration and customization tasks required for hosted applications.

Figure 6:
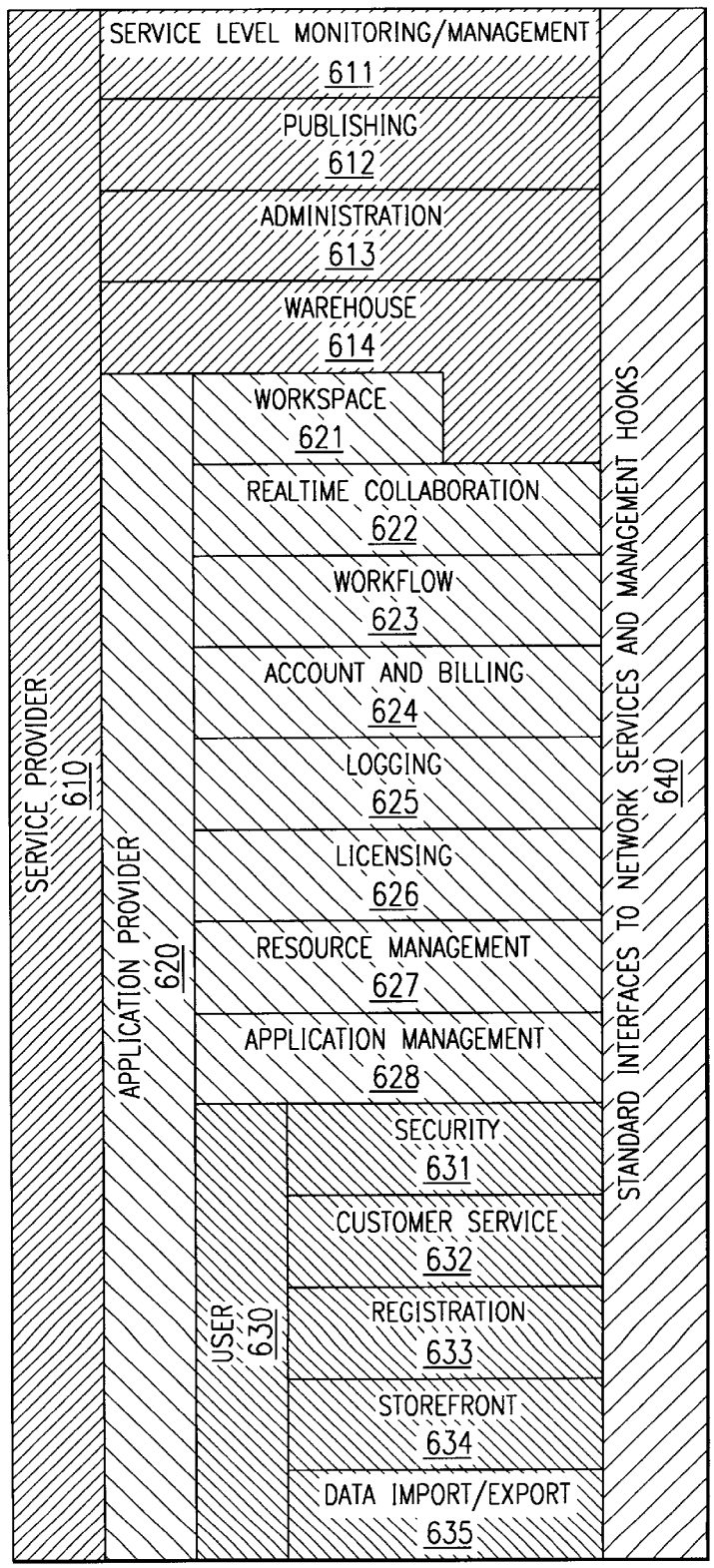
FIG. 6 is a diagram illustrates the application hosting services as well as which party in the offering is involved with its usage.

With reference to FIG. 6, a diagram illustrates the application hosting services as well as which party in the offering is involved with its usage. All of the application hosting services are provided by service provider 610.

User 630 uses the set of customer facing services for registration, support, application browsing and usage tracking. Data import/export 635 enables the import and export of data to and from rented applications. This service enables user 630 to extract application data and move the rental to another service provider if necessary. Storefront 634 manages product information for available applications and display of that information. Storefront 634 consists of a set of templates used to display published product information and support the process of signing up for application rentals. A service provider site can have multiple storefronts for multiple groups enabling the site to provide a customized set of applications for different groups. Storefronts are created by service provider 610 using the publishing service. Registration 633 implements management functions for adding, deleting, and updating application and user registration information. The service manages both the registration of applications within the site including vendor information and profile information associated with each user/group and application pairing. Customer service 632 provides a set of customer-initiated account actions, which include viewing usage status, updating profile and payment information, managing the invited user access to an application instance, and closing an account. Customer service 632 also provides application support such as the support of the infrastructure and resources of the application. Examples include how often backups are done, how much space is allocated and charged for an allocation, and availability of applications. Other customer service support includes content level support for "how-tos", FAQs, and knowledge databases. Finally, security 631 provides services that are used to create a secure environment for application installation, access, and operation by managing application access privileges and server-side execution of untrusted code. Security 631 also provides a single sign-on capability for service provider 610 as well as virtual provide network (VPN) provisioning tasks.

Application provider 620 uses the set of the services related to customer, application, billing provisioning and usage tracking. Application management 628 provides lifecycle management of hosted applications including installation, instantiation, updating, migration, suspension, and removal. The installation operation unpacks the application by following the instructions contained in the metadata of the package. It carries out specific tasks such as creating databases, installing EJBs, etc. Resource management 627 implements the negotiation, allocation, and removal of service provider site resources associated with an application. The service provider advertises (supplies) a set of resources available on the site (such as JDBC, EJB. cig-bin) and the application requests a set of resources it needs to run. The resource service matches demand with supply and performs allocation, reallocation, and deallocation tasks. The resource service maintains a registry of available resource types which are extensible by service provider 610 or a third party. Licensing 626 tracks and manages licenses for hosted applications. Licensing 626 is used to ensure an application is licensed for use by a given user or group of users. Log facility 625 logs all service activities at all levels. Administration 613 can use this facility to view error messages and other operational information. Account & billing 624 manages the definition and accumulation of billable events and charges generated by application usage. Account & billing 624 participates in the gathering and validation of customer payment information. The service allows a site's billing system to be plugged-in to create an agreement. This agreement associates usage information records stored in the site's usage database with customer service records stored in the service provider's back-end systems. Workflow 623 provides business integration across groups of work queues, dynamic workload distribution, and publish/subscribe brokers. Service provider 610 dynamic workload distribution shares workload among available queue managers which are part of the same cluster. It provides extra capacity, or alternative network paths when needed. The publish/subscribe function automates the distribution of relevant information to people and applications who have registered interest in a particular topic. The workflow service is used by service provider 610 to control messages between application provider 620, service provider 610, ISP, and possibly the customer Web browser. Real time collaboration 622 enables distributed communities to communicate, share documents, and share other information in a real-time manner. This service enables application provider 620 to integrate interactive communications into its applications simply by providing push-to-talk buttons on a customer Web page so that customers can be connected to service provider customer care centers or to merchant customer care centers. When a real-time collaboration service is offered by service provider 610, it enables real-time conferencing and chatting between its customers. Finally, workspace 621 is a platform-specific abstraction responsible for the maintenance of a physical application instantiation. The workspace is used to allocate and deallocate an area for an application to be installed onto the server farm for a given user or group. Warehouse 614 maintains a list of instantiations which have associated workspaces. The workspace service also provides a virtual storage environment for end users that enables them to maintain applications, links and files.

Service provider 610 uses the set of publishing and administration interfaces to define and manage applications and their execution environment. Warehouse 614—maintains the installed applications on service provider 610. The information in warehouse 614 includes the application files as well as the metadata describing the applications. When user 630 or group signs up for an application, the application is retrieved from warehouse 614 and instantiated into workspace 621 belonging to service provider 620. Administration 613 provides the administration interface for service provider 610 to publish applications to storefront 634 and monitor application usage, resource consumption, registration information, security settings, and application availability. The administration services provide a programmable interface through which bulk administration of multi-enterprise, multi-user server applications can be accomplished. Publishing 612 establishes which applications are available to which users/groups. When service provider 610 is ready to offer an application to customers, administration 613 uses publishing 612 to publish the application to storefront 634. The publishing process creates an offer of an application, including rental terms and pricing. Each offer can have a different set of materials, allowing the service provider to offer different pricing structures to different customers. Service level monitoring and management 611 supports the administration of the execution environment, management of storage and network connections, and monitoring service levels. This includes such quantitative measures as application availability and response time, and qualitative factors such as responsiveness.

Application hosting service 600 further includes stand interfaces to network service and hooks 640. These service provider interfaces consist of a set of services and facilities available to the application provider as well as the host service provider. Application provider 620 writes to a single set of interfaces enabling the application to participate in the lifecycle (installation, usage, suspension, and removal) and billing aspects of the application. Service provider 610, on the other hand, provides a set of implementations of the services and facilities, which enable the site to publish, accept subscriptions, receive payment and manage web-based applications. As discussed above, each service is extensible enabling service provider 610 to tailor the model to fit any specific needs.

Figure 7:
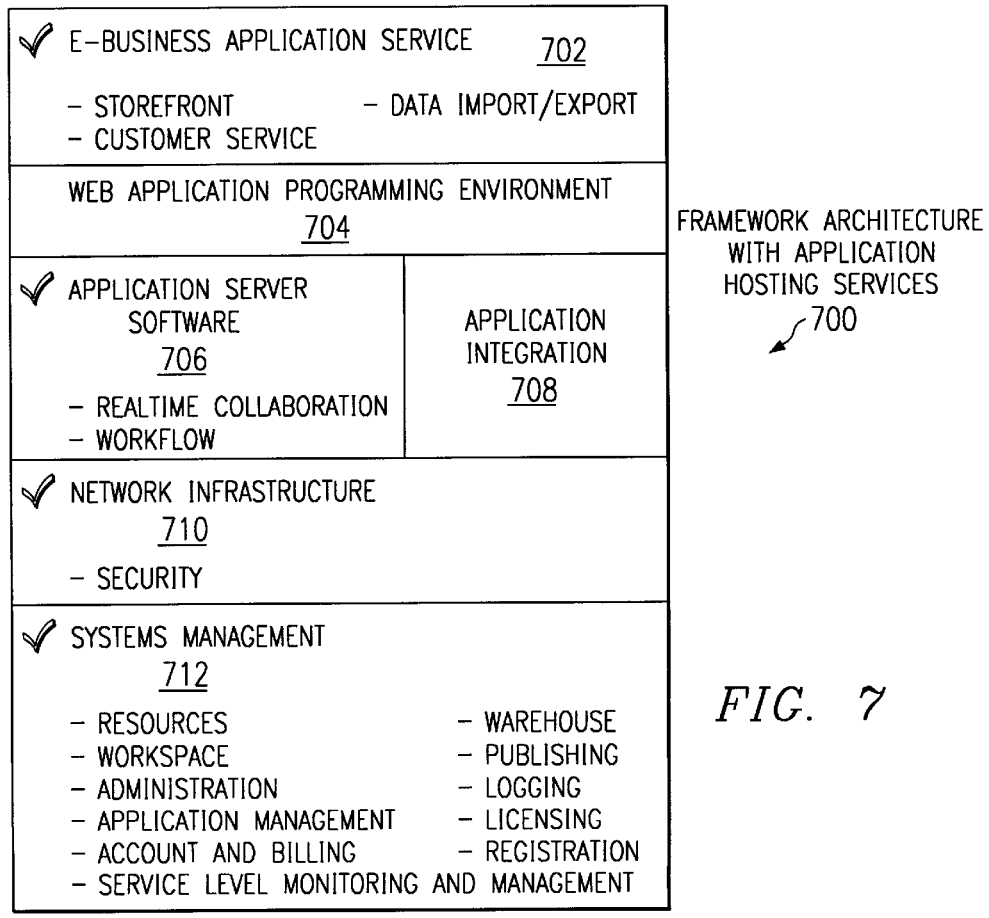
FIG. 7 is a diagram depicting the application hosting services affect on the e-business application services, application server software, network infrastructure, and systems management layers of the framework

The application hosting services are designed and built as extensions to the framework described above with respect to FIG. 4. The framework programming model provides the flexibility and consistent programming environment that allows e-business solutions to be constructed from building block components. Each service in the set of application hosting services is an object orient component designed such as JavaBean or Enterprise JavaBean and implemented adhering to the framework programming model. The services are designed to allow for easy customization or extension by software developers. The services are implemented to accommodate three types of customization. First, as with any JavaBean, interfaces may be extended by creating additional interfaces for any hosting service. Next, since a hosting service is a set of JavaBeans, alternate implementations of a service may be created and replace that service using the same interfaces. Finally, existing business logic may be expanded by wrapping with a JavaBean such that it can be used as a part of any of the hosting services The application hosting services discussed above build on and extend the underlying framework infrastructure and services with functions required for hosting applications. Referring to FIG. 7, a diagram depicting the application hosting services affect on the e-business application services, application server software, network infrastructure, and systems management layers of the framework. The services fall into the distinct categories. The hosting services, which create and manipulate application instances. The user access services, which allow users to rent and join applications. The system management services, which allow a service provider to register applications and manage customers and instances. The central services, which collect usage data, track users and instances.

Here framework 700 depicts how e-business application service 702 provides a storefront, customer service and data import/export. Application server software 706 now accommodates real time collaboration and workflow services for managing service provider workload. Network infrastructure 710 is modified to provide the necessary infrastructure to guarantee customers of reasonable security at the remote service provider. Finally, systems management 712 is now responsible for a group of new services necessary for the service provider's successful supporting an open, shared hosting model. These include resources warehouse, workspace, publishing, administration, logging, application Management, licensing, account & billing, registration and service level monitoring and management.

Figure 8:
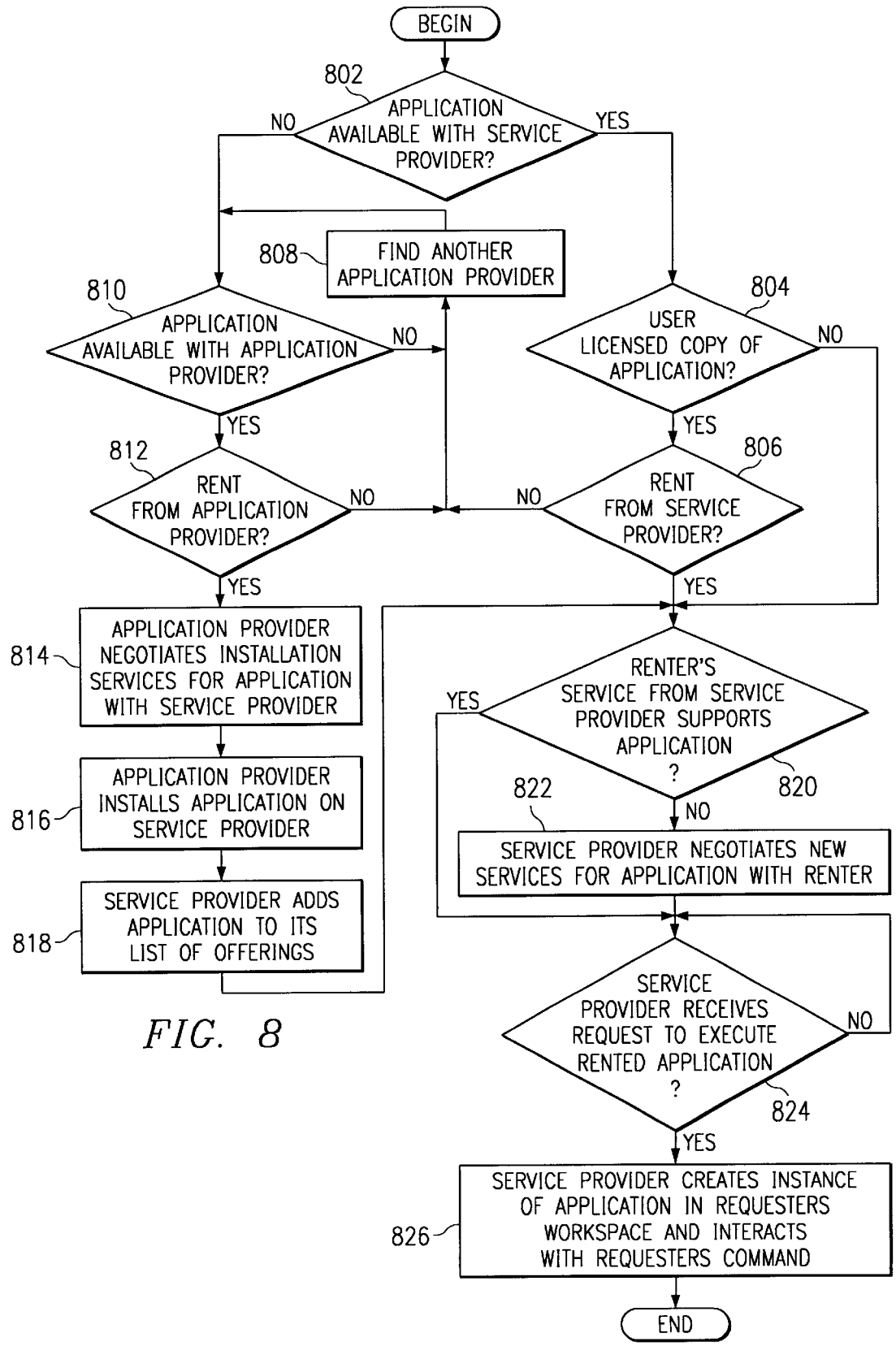
FIG. 8 is a flowchart depicting a process for renting an application using an open, shared hosting model in accordance with a preferred embodiment of the present invention.

Referring now to FIG. 8, a flowchart depicting a process for hosting an application using an open, shared hosting model in accordance with a preferred embodiment of the present invention. For the purposes of describing the depicted process, it is assumed that the user has previously contracted with a service provider for services, however, the user's service provider may not have the capacity and resources to support the particular application being rented.

The process begins with the user checking the service provider for a particular application (step 802). If the application is available through the user's service provider the user must have previously rented a copy of the application in order to use it, so a check is made to determine if the user has a licensed copy of the application (step 804). If the service provider determines that the user has previously rented a copy of the application stored in its warehouse, the service provider must establish that the user/renter has previously contracted with the service provider for adequate services for running the application (step 820). If the service provider has not contracted with the user for the minimum services needed for running the application, the user is notified of the shortfall and the service provider negotiates with the user/renter for new services that are necessary for running the application (step 822). The service provider then awaits instructions from the user/renter to execute the rented copy of the application (step 824). Similarly, if at step 820 the user/renter has user previously contracted with the service provider for the necessary services for running the application, the service provider remains in a ready state awaiting instructions from the user/renter to dynamically download a portion of the rented copy of the application (step 824).

Returning to step 804, if the user has not previously rented a copy of the application, but the application is offered for rent by the service provider, the user may choose to sign up with the service provider to rent a copy of the application (step 806). If the user decides to rent the application from the service provider the service provider must establish that the user/renter has previously contracted for services necessary for running the application (step 820). The process then continues as described above with the service provider negotiating with the user/renter for necessary services for running the application, if the user has not previously contracted for the services necessary for the application (step 822). Once the service provider has made the necessary services available to the user, the service awaits instructions from the user/renter to download a portion of the rented copy and execute the application (step 824).

Returning to step 806, the user is not obligated to rent an application from the service provider even if the service provider lists a copy for rent. The user may shop around for the best deal and licensing terms. If the user decides not to rent from the service provider then the user must find an independent application provider from which to rent the application (step 808). Once an application provider has been found, the user checks its list of applications to determine if the desired application is available from that application provider (step 810). Additionally, the user may check an application provider directly from step 802 if the application is not available through the user's own service provider. If the application provider does not list a copy of the particular application desired by the user, the user must find another application provider (step 808) and check that application provider's list of available applications for the specific application (step 810). If the application provider has the application available in its warehouse the user can then consider the rental terms invoked by the application provider and decide whether or not to rent from the application provider (step 812). Again, the user is free to find another application provider if the rental terms are not satisfactory to the user (step 808) and check that service provider for the application (step 810).

Returning to step 812, at some point the user agrees to rent the application from some application provider and identifies the service provider to host the application. Alternatively, the user may identify the application to the user's service provider.

The application provider will not immediately allow the user's service provider to host the application. Instead, prior to installing the application into the service provider's warehouse, the application provider queries the service provider for the support services necessary for executing and managing the application. If the service provider is able to provide the resources necessary to support the application, the application provider may then provide the application to the service provider. If the service provider is not able to provide the resources necessary to support the application, a negotiation of the resources at a lower fidelity may be performed. For example, if the application requires 100 Megabytes of storage space and the service provider only has 35 Megabytes available, a negotiation may commence in view of the limitations of the service provider.

The installation process negotiates system resources such as database and Java support with the service provider. Additionally, the service provider and application provider must negotiate licensing terms for hosting the application (step 814). The application provider must have assurances from the service provider that the terms of the license agreement for hosting the application will be upheld with the current user as well as with any futures users who choose to rent through the service provider. Once the service provider and application provider have agreed on hosting conditions, the application provider installs the application into the service provider's warehouse (step 816). During the installation process, system resources are allocated for the application by the service provider. The service provider then may add the application to its list of applications offered to potential renters (step 818). Of course, the service provider has the option of creating a new price plan for the application, for example, to include a charge for resources used on the site.

Once again, the service provider must establish that the user/renter has previously contracted for the system resources and services necessary for running the application (step 820). The user/renter negotiates with the service provider for necessary services if the user has not previously contracted for the services (step 822). Alternatively, if the service provider determines that the user has previously contracted for the necessary services, the service awaits instructions from the user/renter to execute the rented copy of the application (step 824). Step 824 shows 'waiting' as an iterative checking for a request to execute the application from the user. The iteration continues until the service provider receives a request from the user/renter to run the application. Then the service provider responds by creating an instance of the application and allocating a workspace for the user and dynamically downloading portions of the application to the user's client computer allowing the user to interact with the application (step 826).

Figure 9:
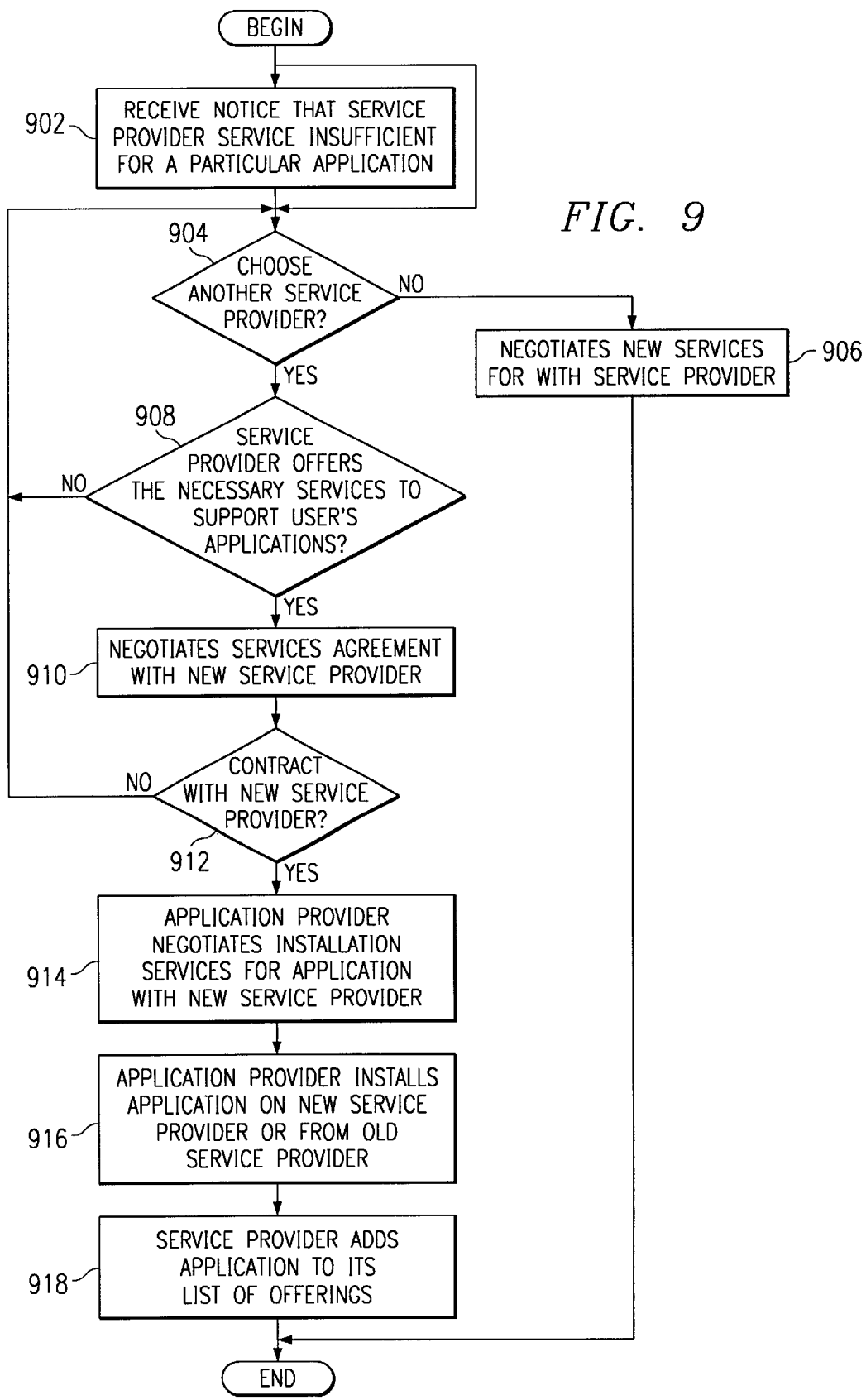
FIG. 9 is a flowchart depicting a process for contracting with service providers for application hosting using an open, shared hosting model in accordance with a preferred embodiment of the present invention.

Referring now to FIG. 9, a flowchart depicting a process for contracting with service providers for application hosting services using an open, shared hosting model in accordance with a preferred embodiment of the present invention. Note here that the process may begin with the user receiving notice from the user's service provider that the current service agreement does not provide for sufficient resources and/or services to support a particular application (step 902). In that case the used must decide whether or not to choose a new service provider (step 904). Alternatively, the process may be initiated by the user deciding whether or not to choose a new service provider. If the user decides not to choose a new service provider then the user must negotiate for new services with the current service provider in order to run the application (step 906). The process then ends with the users acquiring the needed services from the current service provider.

Returning to step 904, if the user decides to choose another (or new) service provider, the user must determine if a particular service provider offers the necessary services for running the particular application (step 908). Additionally, if the user intends to discontinue using the old service provider and transfer all applications to the new service provider, the user must determine if the new service provider offers the services necessary for hosting all applications rented by the user. This may be performed by querying the new service provider for its available services.

If the prospective new service provider does not offer a necessary service the process returns to step 904 where the user again decides whether to choose another new service provider or to possibly negotiated with the current service provider as described above. The process of finding a new service provider continues to iterate through steps 904 and 908 until a new service provider that offers the necessary services is found, the user then negotiates with the new service provider for services (step 910). The user determines whether or not to contract with the new service provider based on the terms offered by the new service provider (step 912). If the user decides not to contract with this new service provider, the process reverts again to step 904 and iterates through step 904 and 908 through 910 until the user agrees on contract terms with another new service provider. It should be understood that a new service provider might have licenses for some or all applications needed by the user already in place. In that case, the service provider has copies of the applications in its warehouse negating the need to install a copy of the application into the warehouse. The process would then end at step 912 for those applications already stored in the warehouse.

Returning to step 912, if the user decides that the contract terms are agreeable, the user then contracts with the new service provider. The user identifies a service provider to host the application. The service provider must then negotiate with an independent application provider for installing the applications needed by the user (step 914). As discussed above, the application provider needs assurances from the service provider that the terms of the license agreement for hosting the application will be upheld with the current and future users. Once agreement has been reached on hosting terms, the application provider installs the application into the new service provider's warehouse. Alternatively, the new service provider may negotiate a license to the application with the previous (old) service provider. Of course, the previous service provider must have been granted permission to negotiate with other service providers by the application provider. The previous service provider may then install the needed applications into the new service provider's warehouse (step 916). The new service provider may then add the application to its list of applications offered to potential renters (step 918).

Application hosting is an important and growing environment that has a unique set of requirements. To satisfy these requirements, existing framework services are extended and new services defined in accordance with the present invention. All services support the framework programming model and are driven into the appropriate standards bodies. These services enable the service provider to minimize operational costs and achieve the appropriate economies-of-scale promised by shared hosting by automating key management and operational tasks in further accordance with a preferred embodiment of the present invention. As the number of users increases, this architecture is considerably more cost-efficient.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system implemented method for hosting au application comprising:

receiving a request to host an application from a user;

automatically negotiating an agreement with an application provider for permission to host the application; and receiving the application from the application provider based on the agreement;

receiving a request to run the application;

allocating a workspace for running the application; and downloading a portion of the application to a client.

2. The method recited in claim 1 above, wherein automatically negotiating an agreement with an application provider for permission to host the application further comprises automatically allocating system resources for the application.

3. The method recited in claim 1 above, wherein automatically negotiating an agreement with an application provider for permission to host the application further comprises negotiating licensing conditions with the application provider.

4. The method recited in claim 1 above, wherein receiving the application from the application provider further comprises automatically allocating resources for the application.

5. The method recited in claim 1 above, wherein receiving the application from the application provider further comprises automatically installing the application into a warehouse.

6. The method recited in claim 1 above further comprises:

renting the application to another user.

7. The method recited in claim 1 above further comprises:

upgrading services to the user for supporting the application.

8. A data processing system implemented method for hosting an application comprising:

receiving a request to host an application from a user;

automatically negotiating an agreement with an application provider for permission to host the application; and receiving the application from the application provider based on the agreement; and dynamically downloading a portion of the application to a thin client, wherein the thin client is under control of the user.

9. A data processing system for hosting an application comprising:

receiving means for receiving a request to host an application from a user, negotiating means for automatically negotiating an agreement with an application provider for permission to host the application; and receiving means for receiving the application from the application provider based on the agreement;

receiving means for receiving a request to run the application;

allocating means for allocating a workspace for running the application; and downloading means for downloading a portion of the application to a client.

10. The system recited in claim 9 above, wherein the negotiating means for automatically negotiating an agreement with an application provider for permission to host the application further comprises allocating means for automatically allocating system resource for the application.

11. The system recited in claim 9 above, wherein the negotiating means for automatically negotiating an agreement with an application provider for permission to host the application further comprises negotiating means for negotiating licensing conditions with the application provider.

12. The system recited in claim 9 above, wherein the receiving means for receiving the application from the application provider further comprises allocating means for automatically allocating resources for the application.

13. The system recited in claim 9 above, wherein the receiving means for receiving the application from the application provider further comprises installing means for automatically installing the application into a warehouse.

14. The system recited in claim 9 above further comprises:

renting means for renting the application to another user.

15. The system recited in claim 9 above further comprises:

upgrading means for upgrading services to the user for supporting the application.

16. A data processing system for hosting an application comprising:

receiving means for receiving a request to host an application from a user;

negotiating means for automatically negotiating an agreement with an application provider for permission to host the application; and receiving means for receiving the application from the application provider based on the agreement; and downloading means for dynamically downloading a portion of the application to a thin client, wherein the thin client is under control of the user.

* * * * *

UNITED STATES PATENT AND TRADEMARK OFFICE
CERTIFICATE OF CORRECTION

PATENT NO.     : 6,816,882 B1
DATED          : November 9, 2004
INVENTOR(S)    : Conner et al.

It is certified that error appears in the above-identified patent and that said Letters Patent is hereby corrected as shown below:

Column 19,
Line 35, after "hosting" delete "au" and insert -- an --.

Signed and Sealed this

Eighteenth Day of October, 2005

JON W. DUDAS
*Director of the United States Patent and Trademark Office*